(12) United States Patent
Suzuki et al.

(10) Patent No.: US 7,005,848 B2
(45) Date of Patent: Feb. 28, 2006

(54) POSITION DETECTING SENSOR

(75) Inventors: Takashi Suzuki, Obu (JP); Satoru Tagawa, Takahama (JP); Takayoshi Tsuzuki, Toyota (JP); Hirofumi Endo, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/464,647

(22) Filed: Jun. 19, 2003

(65) Prior Publication Data
US 2004/0032254 A1 Feb. 19, 2004

(30) Foreign Application Priority Data
Jun. 19, 2002 (JP) ............................. 2002-178763

(51) Int. Cl.
*G01B 7/14* (2006.01)
(52) U.S. Cl. ...................... 324/207.26; 324/207.16; 280/735
(58) Field of Classification Search ................ 324/207.2–207.26, 173, 174
See application file for complete search history.

(56) References Cited

U.S. PATENT DOCUMENTS 6,053,529 A   4/2000 Frusti et al.
6,774,625 B1 * 8/2004 Suzuki et al. ......... 324/207.24

FOREIGN PATENT DOCUMENTS

JP   2000-310646 A   11/2000

* cited by examiner

*Primary Examiner*—Edward Lefkowitz
*Assistant Examiner*—Reena Aurora
(74) *Attorney, Agent, or Firm*—Buchanan Ingersoll PC

(57) ABSTRACT

A position detecting sensor includes a magnet, a magnetic detecting element, and a yoke adjacent to or near the magnet. A detected member is positioned at one side of the position detecting sensor so as to be adjacent to or away from the position detecting sensor. The magnet is oriented to generate a magnetic line of flux which flows in a direction complying with an extending direction of the detected member. The magnetic detecting element is positioned in an area in which a magnetic flux density generated by the magnet is relatively low when the detected member is positioned away from the position detecting sensor and a magnetic flux density is relatively high when the detected member is positioned adjacent to the position detecting sensor.

5 Claims, 4 Drawing Sheets

POSITION DETECTING SENSOR

CROSS REFERENCE TO RELATED APPLICATIONS

This application is based on and claims priority under 35 U.S.C. §119 with respect to a Japanese Patent Application 2002-178763, filed on Jun. 19, 2002, the entire content of which is incorporated herein by reference.

FIELD OF THE INVENTION

This invention generally relates to a position detecting sensor for detecting a position of a magnetic body. More particularly, this invention pertains to a position detecting sensor available as a seat position detecting sensor for detecting a vehicle seat position

BACKGROUND OF THE INVENTION

A seat position sensor as a position detecting sensor has been disclosed in a U.S. Patent published as U.S. Pat. No. 6,053,529. The seat position sensor includes a sensor flange mounted on a flange side of a moveable rail attached to an automotive seat, and a magnetic sensor being of U-shaped cross-section with two legs extending in an upward direction. The magnetic sensor is structurally connected to a stationary rail attached to a floor section. According to the above-described structure, the magnetic sensor can sense the sensor flange passing between the two legs of the magnetic sensor in accordance with seat movement. The sensor flange includes a first flange portion, which passes between the two legs of the magnetic sensor and interrupts magnetic polarity of the magnetic sensor, and a second flange portion, which does not pass therebetween and does not interrupt the magnetic polarity thereof. The magnetic property of the magnetic sensor varies in accordance with position of the sensor flange relative to the magnetic sensor. More particularly, the magnetic sensor outputs on or off signal in accordance with position of the sensor flange relative to the magnetic sensor, thereby enabling to detect the seat position.

However, according to the seat position sensor with the above-described structure, the sensor flange is positioned in the magnetic sensor with the U-shaped structure. In this case, space for mounting the magnetic sensor in the aforementioned manner is required, thereby deteriorating mounting performance.

In order to solve the above-described problem, according to a Japanese Patent Laid-Open Publication published as No. 2000-310646, disclosed is a rotation sensor employing a Hall IC for detecting a position of a detected member relative to the rotation sensor. More particularly, the rotation sensor employs a Hall IC—magnet pair and can be arranged at one side of the detected member, wherein the rotation sensor can be effectively downsized.

However, when an individual fluctuation occurs between the sensor and the detected member, an output from the sensor may not be able to be sufficiently obtained. Therefore, recent demands have lead to improvement of mounting precision.

The present invention therefore seeks to provide a position-detecting sensor capable of detecting a position of a detected member in a general assembling fashion even when a position of the sensor relative to the detected member widely fluctuates.

SUMMARY OF THE INVENTION

In light of foregoing, according to an aspect of the present invention, a position detecting sensor includes a magnet, a magnetic detecting element; and a yoke adjacent to or near the magnet. A detected member made of a magnetic material is positioned at one side of the position detecting sensor so as to be adjacent to the position detecting sensor or so as to be away therefrom. The magnet is oriented to generate a magnetic line of flux which flows from a north pole to a south pole in a direction complying with an extending direction of the detected member. The magnetic detecting element is positioned in an area in which a magnetic flux density generated by the magnet is relatively low when the detected member is positioned away from the position detecting sensor and a magnetic flux density is relatively high when the detected member is positioned adjacent to the position detecting sensor.

According to another aspect of the present invention, a position detecting sensor includes a magnet, a magnetic detecting element, and a yoke. A detected member made of a magnetic material is positioned at one side of the position detecting sensor so as to be adjacent to the position detecting sensor or so as to be away therefrom. The magnet is oriented to generate a magnetic line of flux which flows from a north pole to a south pole in a direction complying with an extending direction of the detected member. The yoke is positioned to have the magnet arranged on a substantially intermediate line extending between the detected member and the yoke when the detected member is positioned adjacent to the position detecting sensor, and the magnetic detecting element is positioned near one of the poles of the magnet.

According to still further aspect of the present invention, a position detecting sensor includes a magnet, a magnetic detecting element, and a yoke adjacent to or near the magnet. A detected member made of a magnetic material is positioned at one side of the position detecting sensor so as to be adjacent to the position detecting sensor or so as to be away therefrom. The magnet is oriented to generate a magnetic line of flux which flows from a north pole to a south pole in a direction complying with an extending direction of the detected member. The magnetic detecting element is capable of detecting a magnetic flux flowing in a specified direction. The magnetic detecting element is positioned in an area in which the flowing direction of the magnetic flux under a condition of the detected member being away from the position detecting sensor is not the same as the flowing direction of the magnetic flux under a condition of the detected member being adjacent to the position detecting sensor.

According to still further aspect of the present invention, a position detecting sensor includes a magnet possessing an approximately ring shaped structure and further possessing inner and outer peripheral surfaces being magnetic, and a magnetic detecting element housed inside the ring shaped magnet. A detected member is movably positioned at one side of the position detecting sensor so as to be adjacent to the position detecting sensor or so as to be away therefrom. The magnet is oriented to generate a magnetic line of flux which flows from a north pole to a south pole in a direction complying with a direction of the detected member.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Preferred embodiments of the present invention will be described hereinbelow in detail with reference to the accompanying drawings.

Figure 1:
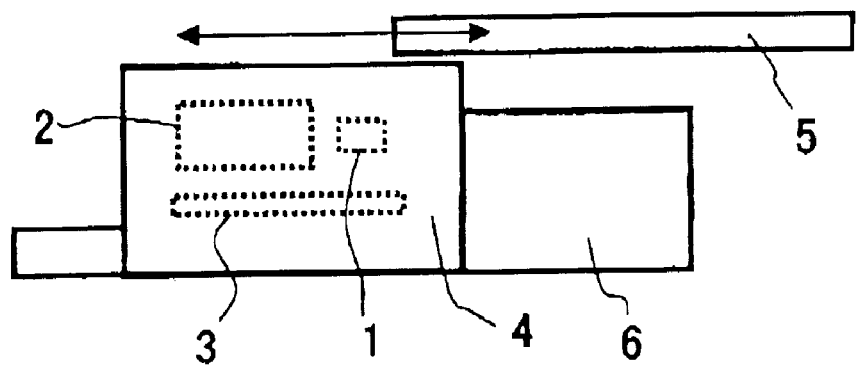
FIG. 1 is a front view illustrating a position detecting sensor according to a first embodiment of the present invention.
Figure 2:
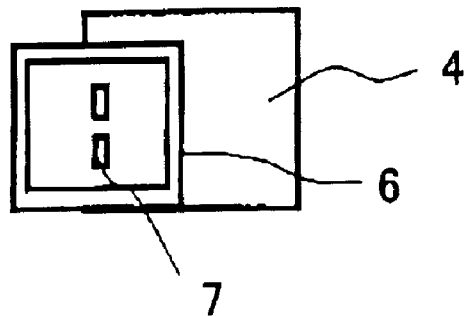
FIG. 2 is a side view of the position detecting sensor illustrated in FIG. 1.

Here will be described a position detecting sensor according to a first embodiment of the present invention with reference to FIGS. 1–4. As illustrated in FIGS. 1 and 2, a case 4 is provided with a connector portion 6. The connector portion 6 houses a terminal 7 therein and transmits output from a magnetic detecting element (described later) to an electronic control circuit (not shown) via a wire harness (not shown). The case 4 houses a magnetic detecting element 1, a magnet 2, and a yoke 3. A detected member 5 is slidably movably oriented at an upper side of the magnet 2 in the drawing. The detected member 5 is made of magnetic material. Although the detailed structure of the detected member 5 is not illustrated, the detected member 5 possesses a projected flange portion of a sensor flange, a notched portion thereof, or a hole defined therein when the position detecting sensor aims for seat position detection. When the sensor flange is fixed to the seat, the sensor is fixedly mounted on a stationary portion (e.g. a vehicle body such as a vehicle floor portion). Alternatively, when the sensor flange is fixedly mounted on the stationary portion, the sensor can be fixed to the seat.

Figure 3:
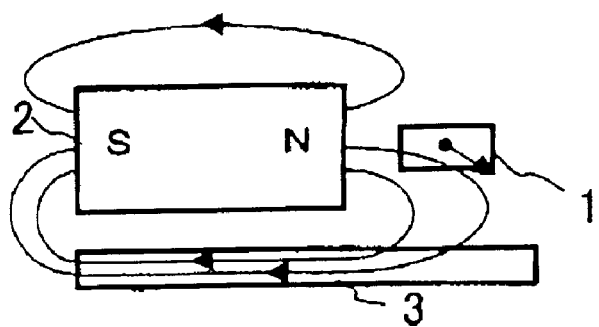
FIG. 3 is a magnetic circuit diagram in which a detected member is positioned away from the position detecting sensor according to the first embodiment.
Figure 4:
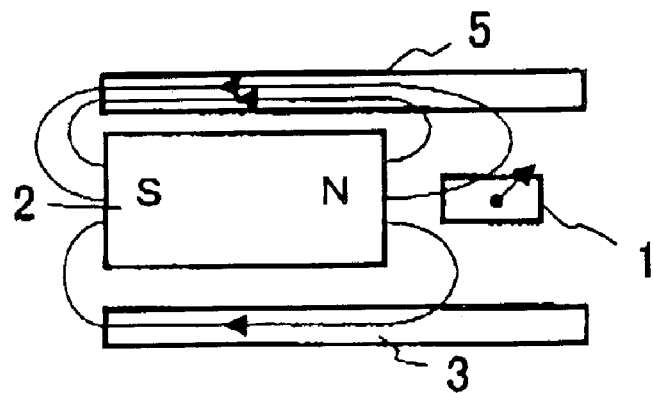
FIG. 4 is a magnetic circuit diagram in which the detected member is positioned adjacent to the position detecting sensor according to the first embodiment.

As seen in FIGS. 3 and 4, the detected member 5, the magnet 2, and the yoke 3 are oriented in the same longitudinal direction. The yoke 3 is made of a magnetic material. In FIGS. 3 and 4, the magnet 2 is oriented to have a north pole at a right hand-side in the drawing and a south pole at a left hand-side therein. Alternatively, the magnet 2 can be oriented oppositely in a right and left direction in the drawing. The magnetic detecting element 1 is oriented near one of the poles of the magnet 2 so as to detect a magnetic flux density flowing in a specified direction. A Hall IC is, for example, used as the magnetic detecting element 1.

As illustrated in FIG. 3, when the detected member 5 is positioned away from the position detecting sensor, most of the magnetic lines of flux generated by the magnet 2 flows from the north pole of the magnet 2 and returns to the south pole via the yoke 3. The magnetic flux flows in a lower right direction in the drawing in the area including the magnetic detecting element 1. In this case, the magnetic detecting element 1 is oriented so as to detect the magnetic flux flowing in a direction generated by turning the lower right direction at a substantially right angle in a counterclockwise direction thereof. Therefore, the magnetic detecting element 1 does not detect a change of the magnetic flux density and outputs an off signal.

As illustrated in FIG. 4, when the detected member 5 is positioned adjacent to the position detecting sensor, the magnetic lines of the magnet 2 passes through not only the yoke 3 but also the detected member 5. A greater amount of magnetic field lines flows via the detected member 5 when a distance between the yoke 3 and the detected member 5 is adjusted or when each magnetic material used for the yoke 3 and the detected member 5 is adjusted. In this case, the magnetic flux flows in an upper right direction in the area including the magnetic detecting element 1. The magnetic detecting element 1 can detect the magnetic flux flowing in this direction. Therefore, the magnetic detecting element 1 can detect a change of the magnetic flux density and outputs an on signal.

The on and off signals are outputted from the terminal 7 by applying and cutting off electric current thereto. Alternatively, the on and off signals can be outputted in a reverse way. Further, electric current change from the terminal 7 or voltage change therefrom can be referred to as an output.

The following description will be given for explaining a second embodiment of the present invention with reference to FIGS. 5 and 6. The case 4 described according to the first embodiment can be applicable for the second embodiment.

According to the second embodiment, the position detecting sensor is provided with a pair of magnets 8 and 9. The magnets 8 and 9 are substantially coaxially arranged with the identical poles being faced each other. The yoke 3 is positioned below the magnets 8 and 9 in the drawing. When the detected member 5 is positioned adjacent to the position detecting sensor, the magnets 8 and 9 are arranged so as to be surrounded between the detected member 5 and the yoke 3. The magnetic detecting element 1 is disposed between the magnets 8 and 9 so as to detect magnetic flux from the magnets 8 and 9 flowing in an up and down direction in the drawing.

Figure 5:
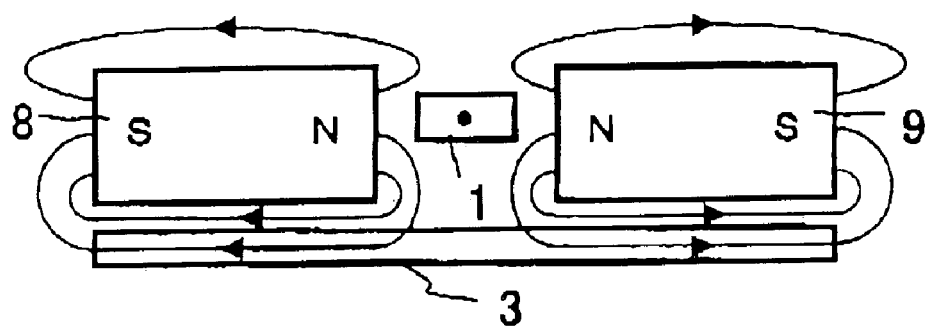
FIG. 5 is a magnetic circuit diagram in which the detected member is positioned away from a position detecting sensor according to a second embodiment.

As illustrated in FIG. 5, when the detected member 5 is positioned away from the position detecting sensor, most of the magnetic lines from each of the magnets 8 and 9 flow from the north pole and returns to the south pole via the yoke 3. In this case, the magnetic flux flowing from the magnets 8 and 9 are cancelled or approximated to zero in the up and down direction in the area including the magnetic detecting element 1. Therefore, the magnetic flux in the up and down direction is balanced in the area including the magnetic detecting element 1, wherein the magnetic detecting element 1 does not detect the change of the magnetic flux density and outputs the off signal. According to the second embodiment, the position detecting sensor is provided with plural magnets 8 and 9. Therefore, the area, in which the magnetic flux is cancelled, can be broadened.

Figure 6:
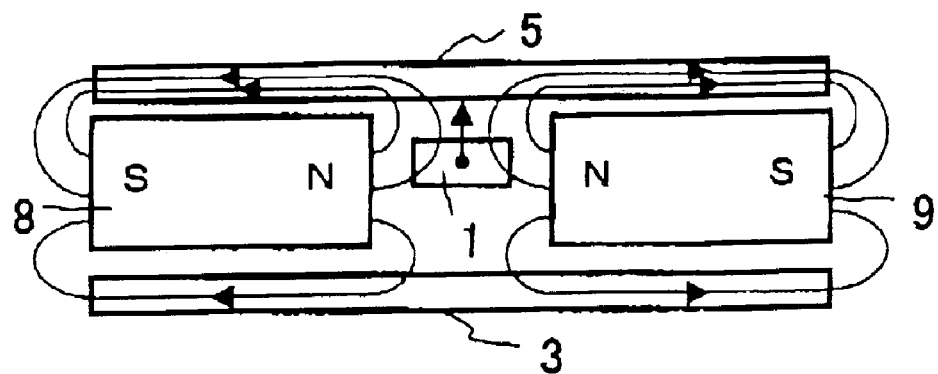
FIG. 6 is a magnetic circuit diagram in which the detected member is positioned adjacent to the position detecting sensor according to the second embodiment.

As illustrated in FIG. 6, when the detected member 5 is positioned adjacent to the position detecting sensor, the magnetic lines form the magnets 8 and 9 flows via not only the yoke 3 but also the detected member 5. In this case, the magnetic flux is generated in an upper direction in the drawing in the area including the magnetic detecting element 1. Therefore, the flux in the area including the magnetic detecting element 1 is overbalanced, wherein the magnetic detecting element 1 detects the change of the magnetic flux density and outputs the on signal.

The following description will be given for explaining a third embodiment of the present invention with reference to FIGS. 7 and 8. The case 4 described according to the first embodiment can be applicable for the third embodiment.

The position detecting sensor according to the third embodiment is provided with a magnet 10 possessing a substantially ring-shaped structure. The magnet 10 possesses a polarity of a north pole in the inner peripheral surface thereof and a polarity of a south pole in the outer peripheral surface thereof. The position detecting sensor according to the first embodiment is provided with the yoke 3. However, the position detecting sensor according to the third embodiment is not provided with a yoke. The magnetic detecting element 1 is centrally positioned in the ring-shaped magnet 10.

Figure 7:
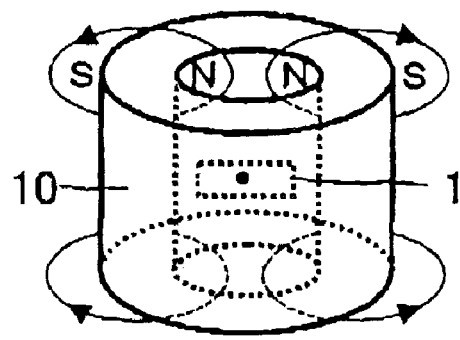
FIG. 7 is a magnetic circuit diagram in which the detected member is positioned away from a position detecting sensor according to a third embodiment.

As illustrated in FIG. 7, when the detected member 5 is positioned away from the position detecting sensor, the magnetic lines from the magnet 10 flows from the north pole and returns to the south pole via upper and lower spaces of the position detecting sensor in the drawing. The magnetic flux is hence cancelled or is approximated to zero in the up and down direction in the drawing and in the right and left direction therein in the area including the magnetic detecting element 1, wherein the magnetic flux is balanced in the area including the magnetic detecting element 1. Therefore, the magnetic detecting element 1 does not detect the change of the magnetic flux density and outputs the off signal.

Figure 8:
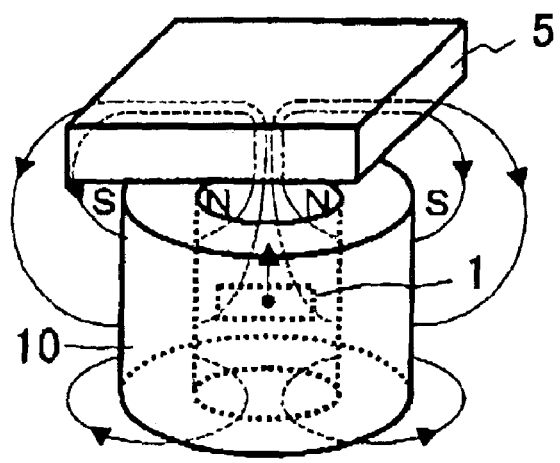
FIG. 8 is a magnetic circuit diagram in which the detected member is positioned adjacent to the position detecting sensor according to the third embodiment.

As illustrated in FIG. 8, when the detected member 5 is positioned adjacent to the position detecting sensor, in the area above the magnet 10, the magnetic field lines from the magnet 10 flows from the north pole and returns to the south pole via the detected member 5. In the area below the magnet 10, the magnetic lines flow in the substantially same manner as FIG. 7. In this condition, the magnetic lines increasingly flows in the area above the magnet 10 and the flux flowing in the upper direction is generated in the area including the magnetic detecting element 1. Therefore, the magnetic detecting element 1 detects the change of the magnetic flux density and output the on signal.

That is, the magnetic flux density is approximated to zero in the central portion in the ring-shaped magnet 10 when there is nothing position around the position detecting sensor. On the other hand, most of the magnetic lines of flux flows from the inside of the magnet 10 to the outside thereof via the detected member 5 when the detected member 5 is positioned adjacent to the position detecting sensor. In this case, the magnetic flux flows in an axial direction of the magnet 10 in the area including the magnetic detecting element 1. Therefore, according to the third embodiment, the magnetic detecting element 1 can detect whether or not the magnetic flux is present in accordance with the presence of the detected member 5 relative to the position detecting sensor. In this case, the position detecting sensor can effectively function with higher detecting precision compared with a position detecting sensor which detects the variable amount of the magnetic flux.

The following description will be given for explaining a fourth embodiment of the present invention with reference to FIGS. 9 and 10. The case 4 described according to the first embodiment can be applicable for the fourth embodiment.

The position detecting sensor according to the fourth embodiment is provided with two magnets 11 and 12, both of which are arranged in parallel to each other with north and south poles being oriented at the same side respectively. The magnets 11 and 12 are also arranged in parallel to the detected member 5. As illustrated in FIGS. 9 and 10, a yoke 13 made of a magnetic material is oriented to connect a south pole of the magnet 11 and a south pole of the magnet 12. Alternatively, the yoke 13 can be oriented to connect a north pole of the magnet 11 and a south pole of the magnet 12. The magnetic detecting element 1 is positioned near the poles of the magnets 11 and 12, which are not connected by the yoke 13.

Figure 9:
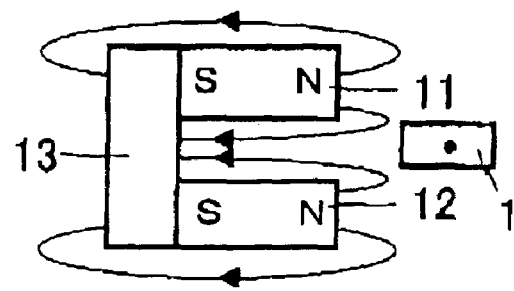
FIG. 9 is a magnetic circuit diagram in which the detected member is positioned away from a position detecting sensor according to a fourth embodiment.

As illustrated in FIG. 9, when the detected member 5 is positioned away from the position detecting sensor, the magnetic lines from the magnet 11 flows from the north pole and returns to the south pole via the space and the yoke 13. The magnetic lines from the magnet 12 flows from the north pole and returns to the south pole via the space and the yoke 13. The magnetic flux flow works in the right and left direction in the drawing, or cancelled or approximated to zero in the area including the magnetic detecting element 1. The magnetic detecting element 1 can detect the magnetic flux flow in the up and down direction in the drawing. Therefore, the magnetic detecting element 1 does not detect the change of the magnetic flux density and outputs the off signal. According to the fourth embodiment, the position detecting sensor is provided with plural magnets 11 and 12. Therefore, the area, in which the magnetic flux is cancelled, can be broadened.

Figure 10:
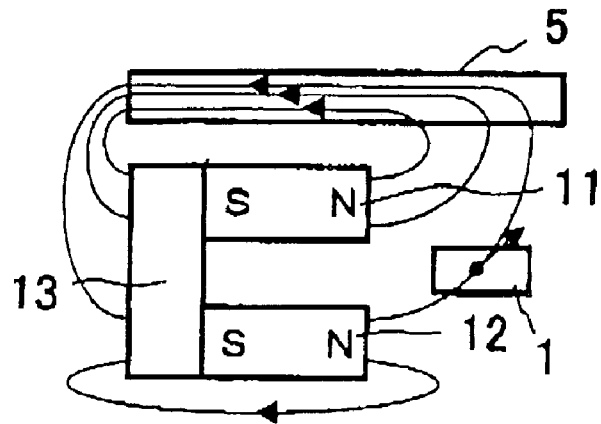
FIG. 10 is a magnetic circuit diagram in which the detected member is positioned adjacent to the position detecting sensor according to the fourth embodiment.

As illustrated in FIG. 10, when the detected member 5 is positioned adjacent to the position detecting sensor, most of the magnetic filed lines from the magnets 11 and 12 flow from the north pole and returns to the south pole via the detected member 5 and the yoke 13. In this case, the magnetic flux flow is changed to the upper direction in the area including the magnetic detecting element 1, wherein the magnetic detecting element 1 detects the change of the magnetic flux density and outputs the on signal.

Figure 11:
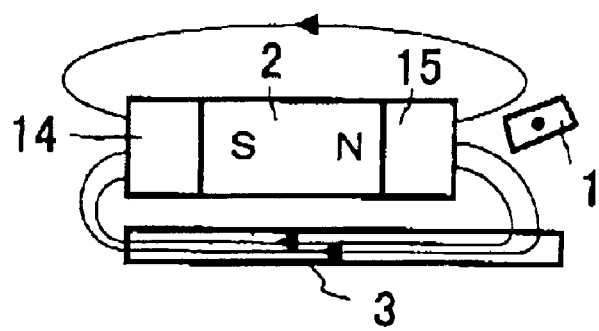
FIG. 11 is a magnetic circuit diagram in which the detected member is positioned away from a position detecting sensor according to a fifth embodiment.
Figure 12:
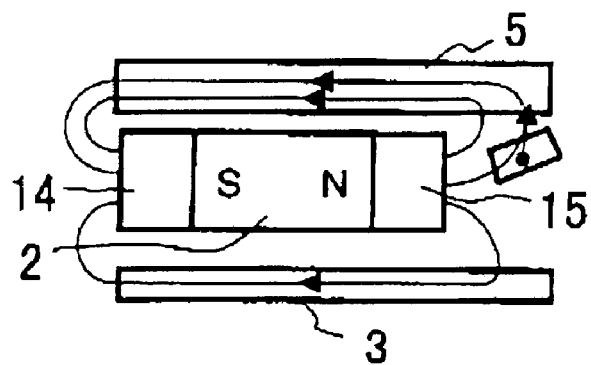
FIG. 12 is a magnetic circuit diagram in which the detected member is positioned adjacent to the position detecting sensor according to the fifth embodiment.

The following description will be given for explaining a fifth embodiment of the present invention with reference to FIGS. 11 and 12. The case 4 described according to the first embodiment can be applicable for the fifth embodiment.

The position detecting sensor according to the fifth embodiment is provided with yokes 14 and 15. The yoke 14 is contact with a south pole of the magnet 2, and the yoke 15 is contact with a north pole thereof. According to the fifth embodiment, the volume of the magnet 2 can be effectively decreased and the substantially same amount of the magnetic flux can be still detected. Therefore, the manufacturing cost for manufacturing the position detecting sensor can be effectively reduced.

According to the embodiments of the present invention, an area, in which the magnetic flux is not detected, can be adjusted by increasing or decreasing a thickness of the magnet. Further, the area, in which the magnetic flux is not detected, can be moved by adjusting a shape of the yoke.

The position detecting sensor according to the present invention is provided with the magnetic detecting element 1 which can detect the magnetic flux flow in the specified direction. Therefore, the magnetic detecting element 1 can detect whether the magnetic flux is present or not in accordance with the presence of the detected member 5 relative to the position detecting sensor. In this case, the position detecting sensor can effectively function with higher detecting precision compared with a position detecting sensor which detects the variable amount of the magnetic flux.

As described above, the magnetic detecting element 1 is arranged in an area in which the magnetic flux density is switched to a substantially zero value or to a threshold value in response to the presence of the detected member 5 relative to the position detecting sensor. According to the present invention, the magnetic detecting element 1 arranged in the above-described manner can easily detect whether the detected member 5 is positioned away from or adjacent to the position detecting sensor. Therefore, even if the gap between the detected member 5 and the position detecting sensor is expanded due to fluctuation upon assembling the position detecting sensor to a vehicle seat or due to offsetting upon movement of the vehicle seat having the position detecting sensor, the magnetic detecting element 1 can effectively detect whether the detected member 5 is positioned away from or adjacent to the position detecting sensor. Further, the position detecting sensor is arranged at one side of the detected member, thereby enabling to improve the assembling performance.

The principles, preferred embodiments and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A position detecting sensor comprising:
   a magnet;
   a magnetic detecting element; and
   a yoke adjacent to or near the magnet,
   wherein a detected member made of a magnetic material is positioned at one side of the magnet so as to be adjacent to the magnet or so as to be away therefrom, the magnet is oriented to generate a magnetic line of flux which flows from a north pole to a south pole in a direction complying with an extending direction of the detected member, and the magnetic detecting element is positioned in an area in which a magnetic flux density generated by the magnet is relatively low when the detected member is positioned away from the magnet and a magnetic flux density is relatively high when the detected member is positioned adjacent to the magnet.

2. A position detecting sensor according to claim 1, wherein the magnetic detecting element is capable of detecting a magnetic flux flowing in a specified direction, the area including the magnetic detecting element has a variable flowing direction of the magnetic flux in response to the position of the detected member relative to the magnet.

3. A position detecting sensor according to claim 2, wherein the yoke is positioned to have the magnet arranged on a substantially intermediate line extending between the detected member and the yoke when the detected member is positioned adjacent to the magnet, and the area including the magnetic detecting element is near one of the poles of the magnet.

4. A position detecting sensor comprising:
   a magnet;
   a magnetic detecting element; and
   a yoke;
   wherein a detected member made of a magnetic material is positioned at one side of the magnet so as to be adjacent to the magnet or so as to be away therefrom, the magnet is oriented to generate a magnetic line of flux which flows from a north pole to a south pole in a direction complying with an extending direction of the detected member, the yoke is positioned to have the magnet arranged on a substantially intermediate line extending between the detected member and the yoke when the detected member is positioned adjacent to the magnet and the magnetic detecting element is positioned near one of the poles of the magnet.

5. A position detecting sensor comprising:
   a magnet;
   a magnetic detecting element; and
   a yoke adjacent to or near the magnet;
   wherein a detected member made of a magnetic material is positioned at one side of the position detecting sensor so as to be adjacent to the magnet or so as to be away therefrom, the magnet is oriented to generate a magnetic line of flux which flows from a north pole to a south pole in a direction complying with an extending direction of the detected member, the magnetic detecting element is capable of detecting a magnetic flux flowing in a specified direction, and the magnetic detecting element is positioned in an area in which the flowing direction of the magnetic flux under a condition of the detected member being away from the magnet is not the same as the flowing direction of the magnetic flux under a condition of the detected member being adjacent to the magnet.

* * * * *